United States Patent [19]
Gadducci et al.

[11] Patent Number: 5,570,380
[45] Date of Patent: Oct. 29, 1996

[54] SURVIVAL SEQUENCE REGISTER FOR VARIABLE THRESHOLD QUALIFICATION FOR RECORDING CHANNELS

[75] Inventors: Paolo Gadducci, Tirrenia; David Moloney, Cornaredo; Giorgio Betti, Milan, all of Italy

[73] Assignee: SGS-Thomson Microelectronics, S.r.l., Agrate Brianza, Italy

[21] Appl. No.: 346,601

[22] Filed: Nov. 29, 1994

[30] Foreign Application Priority Data

Nov. 30, 1993 [EP] European Pat. Off. ............. 93830485

[51] Int. Cl.[6] .................................................. G06F 11/00
[52] U.S. Cl. .............................................. 371/57.1; 371/48
[58] Field of Search ................................... 371/57.1, 57.2, 371/48; 360/51, 53, 55, 39, 46, 67; 307/351, 117, 164, 350, 358, 354, 360, 361, 350; 328/114, 117, 118, 119, 132, 164

[56] References Cited

U.S. PATENT DOCUMENTS

| | | | |
|---|---|---|---|
| 4,000,513 | 12/1976 | Precourt | 360/45 |
| 4,626,933 | 12/1986 | Bucska et al. | 360/51 |
| 4,634,896 | 1/1987 | Shrinkle | 307/351 |

OTHER PUBLICATIONS

IEEE Transactions on Magnetics, Y. Ouchi, et al., "A New Signal Detection Method With Two Slice Levels", Sep., 1987, pp. 3675–3677.

24th Assilomar Conference K. Chopra et al., A Soft Decision Detection Method for Run–Length Limited Recording Channels, p. 679.

Primary Examiner—Robert W. Beausoliel, Jr.
Assistant Examiner—Phung My Chung
Attorney, Agent, or Firm—Robert Groover; Betty Formby

[57] ABSTRACT

A survival sequence register for a read channel employing a variable threshold peak qualification technique, has a first data shift register receiving a logic sum stream of two serial streams of coded digital data, corresponding to qualified peaks detected by a reading pick-up of positive and negative sign, respectively, and a pointer register. A control circuit generates an erase signal when an incoming pulse is recognized as corresponding to a detected peak of the same sign of the previously detected peak. The erase signal is input to logic gates which each drive a reset terminal of a flip-flop of the data shift register, with the exception of the first flip-flop of the register. The pointer register being reset when the control circuit receives a pulse corresponding to a peak of opposite polarity of the detected peak relative to the preceding pulse.

22 Claims, 4 Drawing Sheets

SURVIVAL SEQUENCE REGISTER FOR VARIABLE THRESHOLD QUALIFICATION FOR RECORDING CHANNELS

CROSS-REFERENCE TO RELATED APPLICATION

This application claims priority from European app'n 93830485.4, filed Nov. 30, 1993, which is hereby incorporated by reference. However, the content of the present application is not necessarily identical to that of the priority application.

BACKGROUND AND SUMMARY OF THE INVENTION

The invention relates to a register for a serial stream of coded data provided with means for recognizing spurious pulses deriving from a peak detection process of reading data recorded on a mass storage support, in order to provide an output serial stream of coded data, purged of bits that are recognized as invalid.

When reading coded data recorded on mass memory (e.g., a hard disk), besides useful signals, the reading pick-ups detect: a) noise due to variations of physical parameters of the recording support and of the pick-ups, b) the so-called thermal noise and c) noise due to interferences among data recorded on tracks adjacent to the one being read by the pick-up.

With an increase in packing density of recording tracks, the noise due to interference phenomena among data recorded on adjacent tracks increases to a point of transforming itself from indeterministic to deterministic. As a consequence, the signal output by the reading pick-up may contain spurious peaks due to bits ("1") recorded on tracks adjacent to the one being read by the pick-up, which superimpose or interpose themselves on or between the peaks corresponding to the "1" relative to the data being read from the recording support.

According to common techniques with which data are recorded on a support such as a hard disk, the signal, filtered from pick-up noise, should be composed ideally of a sequence of peaks, alternately of opposite polarity, corresponding to logic "1" of coded data that are recorded on the track being read, "spaced" by intervals without peaks, corresponding to the logic "0". (See generally C. Mee et al., MAGNETIC RECORDING HANDBOOK (1989), which is hereby incorporated by reference. Relevant block diagrams may be found in the section Read Channel of the "Storage Product 1993 Data Book" of Silicon Systems (e.g. in relation to devices SSI32P4731 and SSI32P474).)

In order to curb the effects of noise, the peaks detected by the pick-up may be accepted, or "qualified", when their amplitude extend beyond a certain fixed threshold level, positive or negative. When the noise component due to interferences caused by recordings present on adjacent tracks becomes prevailing, a peak qualification technique based on fixed thresholds, may introduce errors if interference peaks cause the instantaneous signal's amplitude to become larger than the respective threshold, positive or negative, as depicted in FIG. 1.

Under conditions of strong inter-track interference, a peak qualification system which is based on a variable threshold has proved itself more effective. The system qualifies a detected peak of the same sign of the last detected peak only if its level is greater than the level of the last detected peak, while the qualification is automatic if the detected peak is of opposite sign of the last detected peak. The effects of a variable threshold system (Adaptive Threshold Qualifier) are depicted in FIG. 2.

As may be easily observed in FIG. 2, in case successive peaks of the same polarity are qualified (positive polarity in the shown example), the peak having the greatest probability of being correct is the last one because of amplitude necessarily greater than a preceding peak or preceding peaks of the same sign.

In practice, a variable threshold qualification circuit (ATQ) produces two streams of digital data: qualified positive peaks correspond to the logic "1" of a first stream (SWP), while qualified negative peaks correspond to the logic "1" of a second stream (SWN). Of course, disregarding spurious peaks that may be qualified by the qualification circuit (ATQ), the output serial stream of coded data is simply given by the logic sum of the two digital data streams (SWP and SWN). In case of spurious peaks qualification it is necessary to eliminate the "1" recognized as spurious.

The system requires the use of special circuits for eliminating the spurious pulses deriving from the detection of spurious peaks by the reading pick-ups, the presence of which may be recognized by a simultaneous presence of more than one pulse of the same polarity between two pulses of opposite polarity. Moreover, a variable threshold qualification system allows the system to consider as valid the last one of such a sequence of pulses of same polarity and therefore to eliminate all but the last pulse.

A system of this type is described in Chopra et al., "A Soft Decision Method for Run-Length Limited Recording Channels," presented at the 24th ACSSC in 1990, which is hereby incorporated by reference.

A main objective of the present invention is to provide a survival sequence register (SSR), having a simple architecture and a great reliability, capable of processing the two serial data streams produced by a variable threshold circuit (ATQ), eventually recognizing in either one or the other stream a succession of pulses that may be attributed to the picking-up of peaks of the same polarity by a reading pick-up and therefore eliminating all the pulses of the "monopolar" (sequence) with the exception of the last one detected in order of time by the reading pick-up.

The system of the invention is based upon the recognition of an illicit succession due to the presence of pulses derived from the picking-up of peaks of the same polarity and on the consequent cancellation of spurious "1" from the serial stream of coded data, corresponding to the logic sum of the two streams produced by the variable threshold qualification circuit (ATQ), shifting through a register capable of storing a sufficient "depth" of the sequence of coded serial data in order that the shift register always contains at least a logic "1", depending upon the write/read coding that is employed.

Cancellation of spurious "1" from a sequence stored in the shift register, because identified as due to the reading of spurious peaks by the reading pick-up and qualified by the ATQ circuit, takes place by resetting the relative flip-flop of the shift register through a logic gate, having at least three inputs, that drives the reset terminal of the flip-flop.

An erase signal, generated by a circuit capable of recognize a succession of pulses ("1") corresponding to detected peaks of the same polarity, that are not intermeshed with peaks of opposite polarity, is eventually applied to a first input of the erasing logic gate.

A signal, derived from a corresponding tap of a second (pointer) register that points a spurious "1" to be cancelled from the sequence stored in the first shift register, is fed to a second input of the erasing logic gate.

A disabling signal, derived from the Q output of the same flip-flop that is reset by the respective logic gate, is applied to a third input thereof. By such a fed-back signal, the erasing logic gate is self-synchronized, by having its activated output only for the time necessary to erase the spurious bit ("1"), pointed by the pointer register. As soon as the spurious bit has been cancelled, the erasing gate is disabled and therefore the cancellation input that is applied to the flip-flop through its reset terminal terminates.

The duration of the erase input is therefore positively less than the clock period, thus avoiding the loss of data during the shifting through the shift register of a correct sequence of bits.

BRIEF DESCRIPTION OF THE DRAWING

The disclosed inventions will be described with reference to the accompanying drawings, which show important sample embodiments of the invention and which are incorporated in the specification hereof by reference, wherein.

The different aspects and advantages of the circuit of the invention will become more evident through the following description of several important embodiments and by referring to the attached drawings, wherein.

Figure 1:
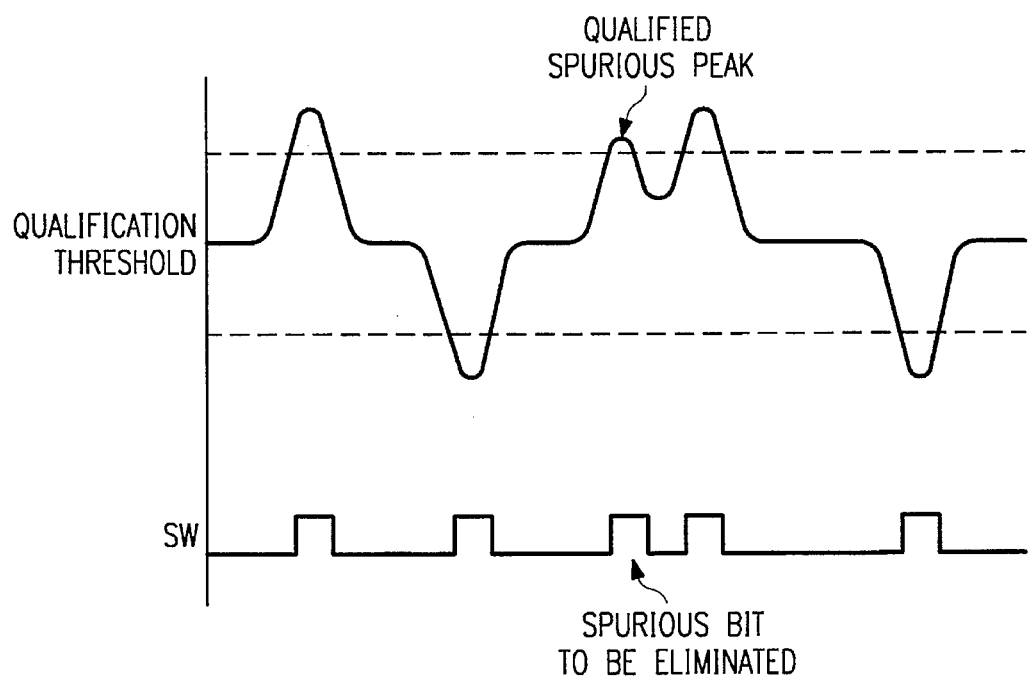
FIG. 1 shows the operating principle of a fixed threshold qualification system, as described above.
Figure 2:
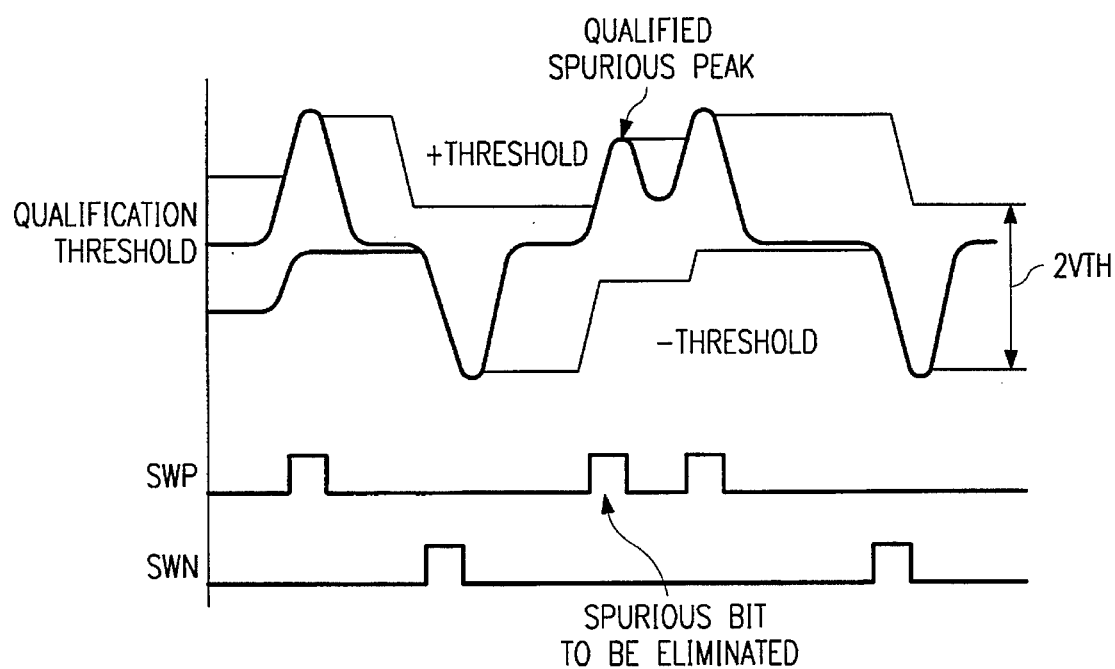
FIG. 2 shows a variable threshold qualification system, as described above.
Figure 3:
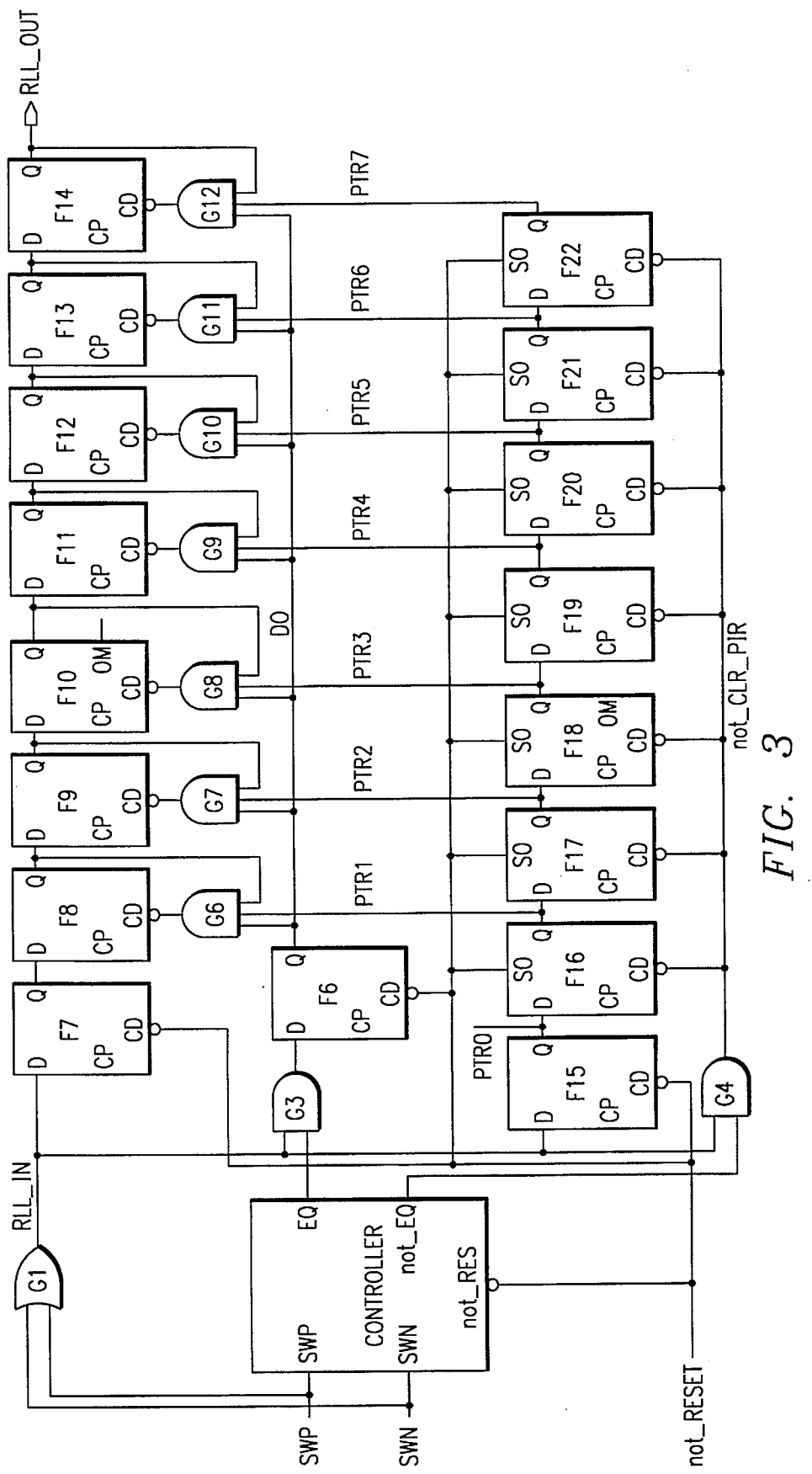
FIG. 3 is a functional diagram of a survival sequence register (SSR) object of the present invention.

The two input digital data streams SWP and SWN supposedly may be produced by any known variable threshold qualification circuit (ATQ), not depicted in the diagram of FIG. 3, according to an operating principle as the one depicted in FIG. 2 and described above.

DETAILED DESCRIPTION OF THE PREFERRED EMBODIMENTS

The numerous innovative teachings of the present application will be described with particular reference to the presently preferred embodiment (by way of example, and not of limitation), in which:

By referring to the circuit diagram of FIG. 3, a serial stream of coded data, equivalent to a logic sum of two input streams SWP and SWN may be produced by employing an OR circuit G1, or any combinatorial logic circuit equivalent thereto.

A read/write coding of data to and from a mass storage support, may be customarily an RLL (Run Length Limited) coding, that represents the type of coding most widely used in write/read channels of hard disks. This type of coding takes into consideration the interference problems that would be caused by the physical proximity of consecutive "1" recordings (peaks), by imposing a minimum and a maximum number of "0" between any two consecutive "1" (recorded peaks), for example the RLL(1,7) code imposes the presence of at least one "0" and a maximum of seven "0" between two successive "1", while the RLL(2,7) code, imposes the presence of at least two "0" and a maximum of seven "0" between two consecutive "1".

The synchronous serial stream (RLL_IN) produced by G1 is fed to the input of a first (data) shift register F7–F14, which may be composed of a number of flip-flops sufficient to store a certain "depth" of sequence. It is practically useless that the "depth" of storing of the data shift register be greater than the maximum "separation" between any two consecutive "1" that is admitted by the particular coding, because the occurrence of such a situation would mean that an error has occurred in the phase of validation of the pulses coming from the reading pick-up (an error that cannot be corrected by the SSR). Normally, a shift register sufficiently extended so that at least a "1" is always present may be satisfactorily used.

Of course, in case of codings different from an RLL coding, the number of flip-flops that compose the data shift register (RLL_IN RLL_OUT) may be increased or decreased depending on the particular type of coding used.

With the exception of the first flip-flop F7, all the other flip-flops F8–F14 that compose the first (data) shift register, have a reset terminal that is driven by a three input NAND gate G6–G12.

To an input of each NAND gate, is applied a signal that is present on a respective tap (represented by the Q output of a corresponding flip-flop) of a second (pointer) shift register containing a pointer of the last "1" of the input sequence, composed by the flip-flops F15–F22, and to which the same serial data stream (RLL_IN) is fed.

With the exception of the first flip-flop F15, all the other flip-flops F16–F22 of the pointer register are reset by a signal that is produced at the output of a single NAND gate G4 that cancels the pointer (i.e. it cancels the only "1" shifting through the pointer register) when an input bit, arrived with the SWP stream (relative to the detection of positive peaks qualified by the circuit ATQ) or with the SWN stream (relative to the detection of negative peaks qualified by the ATQ circuit), is representative of a detected peak of opposite sign of the one preceding it, as will be explained hereinafter.

The two input serial streams SWP and SWN are fed to two inputs of a control circuit (CONTROL) capable of producing a pair of complementary signals EQ and EQ\. The EQ signal assumes a logic "1" value when the control circuit detects the arrival of "1" due to a peak of sign equal to the sign of the peak detected last (i.e. a succession of pulses corresponding to the detection by the reading pick-up of peaks of the same sign) (FIG. 2).

The EQ signal, applied to the input of a logic AND gate G3, to a second input of which the RLL serial signal produced by G1 is applied, determines the generation, at the output of G3, of an erase signal DEL, which is delayed by a clock period by the flip-flop F6 in order to synchronize it with the RLL stream shifting through the first data register F7–F14.

The complementary signal EQ\ is applied to an input of a NAND gate G4, to the other input of which the serial RLL signal is applied. The gate G4 erases the pointer signal ("1") shifting through the second pointer register F15–F22, when the input data (arrived with the SWP or with the SWN streams) is due to the detection of a peak of opposite sign as referred to the peak detected last.

The NAND gates G6–G12 and the relative flip-flop F8–F14 of the data shift register constitute as many self-synchronized networks. In fact, a third input of each of the NAND gates G6–G12 is connected to the Q output of the respective (controlled) flip-flop (F8–F14) of the first data shift register.

In this way, the signal that is eventually produced at the output of the NAND gate erases an eventual spurious logic "1" present in the RLL sequence, as conclusion of the following process: a) generation of the erase signal DEL and b) combination of the erase signal DEL with the pointer signal, derived from the respective tap (output Q of the respective flip-flop) of the second (pointer) register F15–F22, thus resetting the respective flip-flop F8–F14, and c) disabling the NAND gate and terminating the erase command as soon as the pointed bit has been cancelled.

In this way, the loss of data during the shifting of the data stream through the register F7–F14, containing the correct RLL sequence is positively prevented by ensuring that the duration of the erase pulse DEL is always less than the period of the clock signal CLK that synchronizes the whole circuit.

Figure 4:
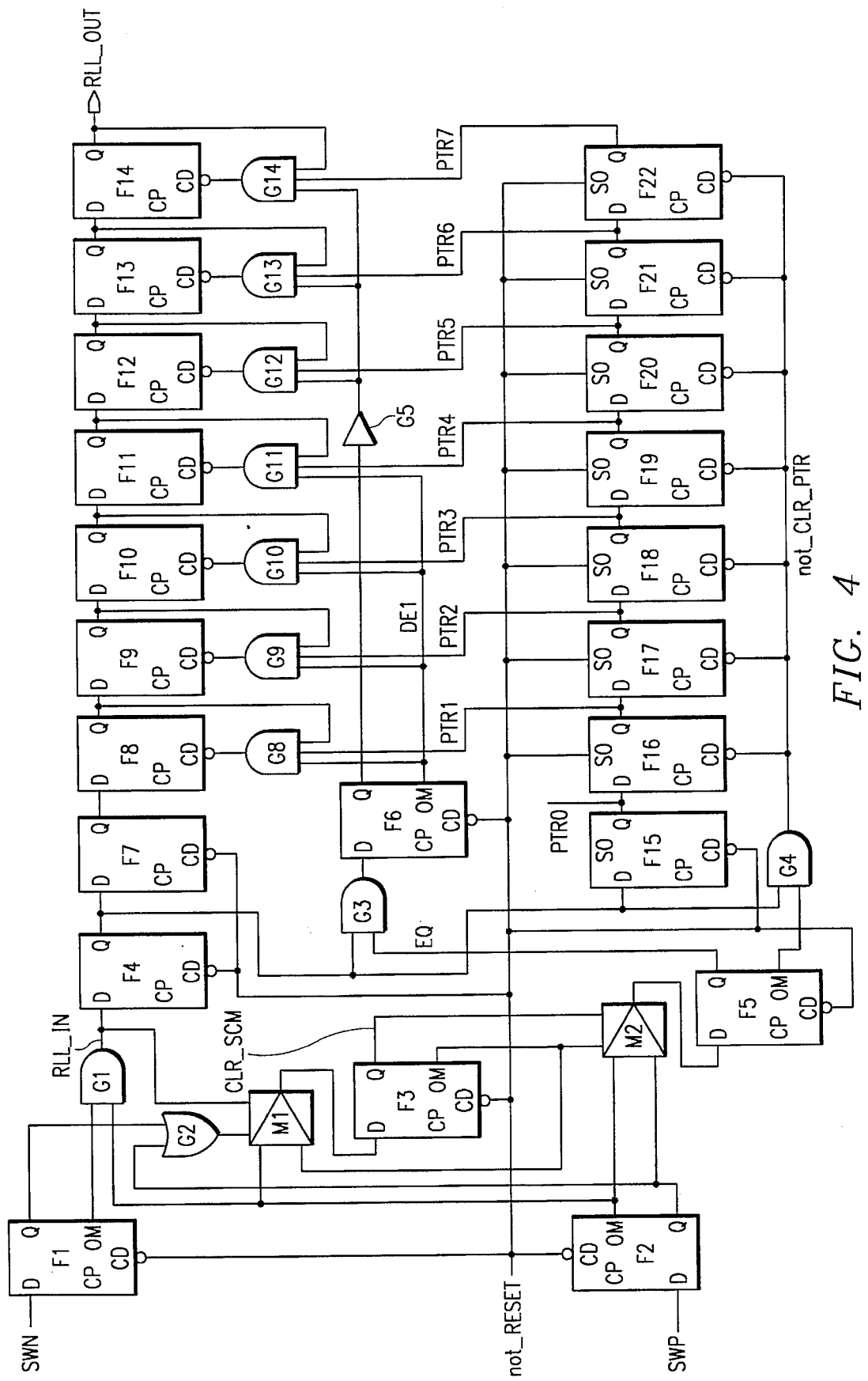
FIG. 4 shows an embodiment of the circuit that generates an erase signal for a register as the one depicted in FIG. 3.

An embodiment of the control circuit (CONTROL) is depicted in FIG. 4.

The flip-flops F1 and F2 synchronize the input SWN and SWP data streams with the clock signal CLK. The flip-flop F3 is used for storing the sign of the last qualified peak (OLD_SIGN). The flip-flop F3 stores the sign of the last "1" entered. In particular the OLD_SIGN signal is a "1" or a "0" when the pulse arrives with the SWP or with the SWN streams, respectively. In absence of a "1" at its inputs, the multiplexer M1 connects its output to the input of F3, in order to retain the stored sign for each clock pulse. When there is an incoming "1", M1 commutes and the sign is updated.

The multiplexer M2 is used as a comparator: when OLD_SIGN is "1", the output of M2 is connected to SWP and has a "1" value if SWP is "1", that is if the sign of the incoming bit coincides with the sign of the bit that has preceded it. The output of M2 is at "1" when OLD_SIGN is equal to "0" and SWP is equal to "0".

The flip-flops F4 and F5 are not strictly necessary for the operation of the system. They are advantageously used for timing the two streams (RLL_IN and the output of M2), thus implementing a so-called "pipelined" architecture, capable of recovering the delay that is introduced by M2.

The erase signal DEL at the output of the flip-flop F6 may be replicated by an inverter G5 in order to decrease the load at the output Q\of the flip-flop F6.

Figure 5:
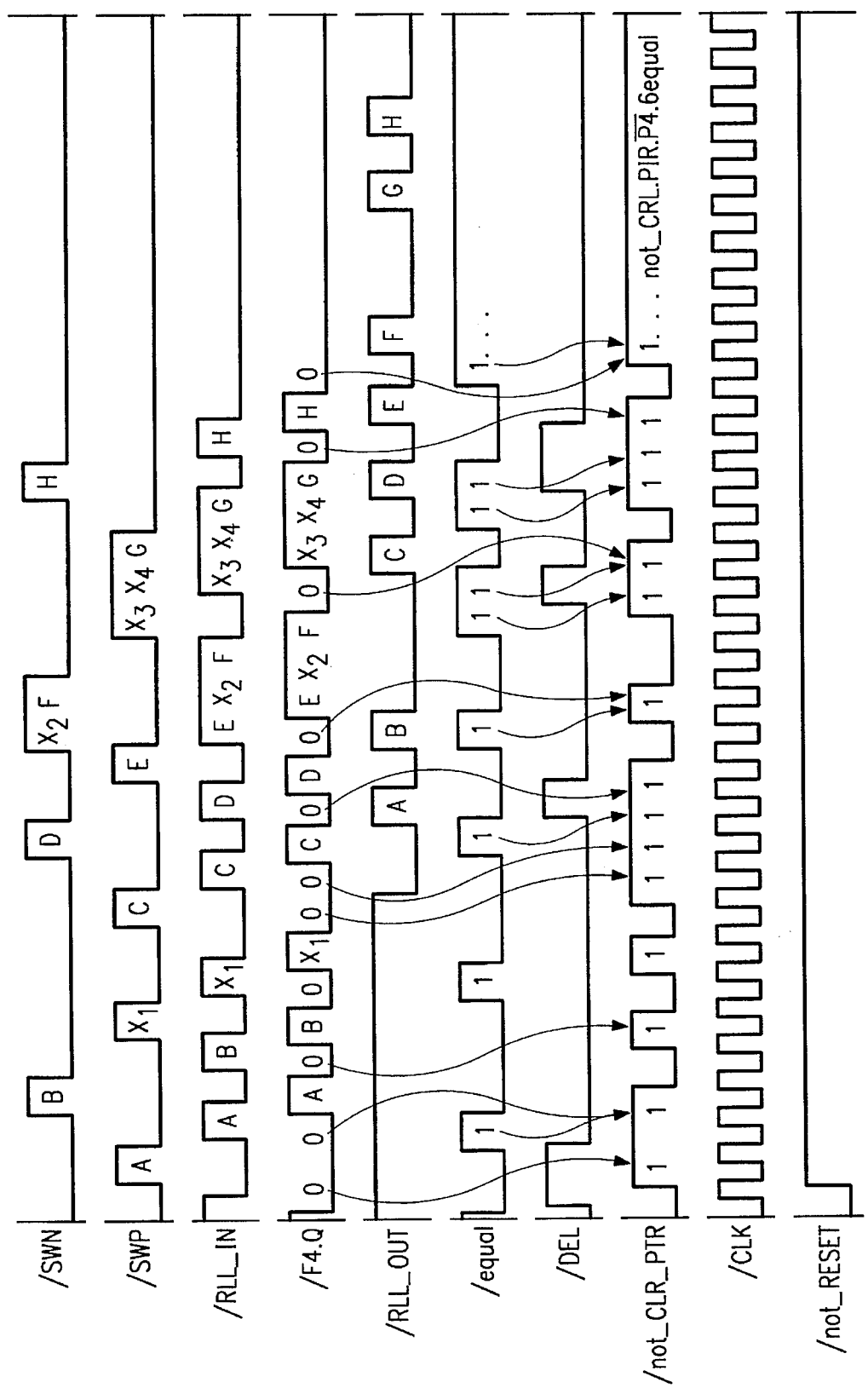
FIG. 5 is a set of timing diagrams that depict the operation of a register of the invention.

Timing diagrams for the significative signals of the circuits shown in FIGS. 3 and 4 are illustrated in FIG. 5. As may be observed, the spurious "1", identified by the X sign, are cancelled from the register and the output serial stream RLL_OUT contains the correct sequence A B C D E F G H, purged from the spurious "1" (X) that were present in the two input serial streams SWN and SWP.

Referring to FIG. 4, the signal "equal" is significant only when a pulse is present at the output of F4 (in fact, it passes through the gate G3), because only in these conditions is the content of F3 updated, and therefore the content of F5 becomes significant during the subsequent period.

In FIGS. 4 and 5, it may be seen that the shift register relative to the pointer (F15–F22) is set to zero (not_CLR_PTR low) only when at the output of F4 there is a pulse relative to a peak of opposite sign of the preceding one. In case of consecutive pulses of the same sign, the pointer is not erased and is used for erasing, during the successive cycle, the spurious pulse contained in the data shift register (F7–F14). The pointer of the erased data is not erased because it is not necessary. In fact, if another DEL command arrives before the pointer has exited the shift register, a further reset of the flip-flop that contained the previously erased data is attempted.

According to a disclosed class of innovative embodiments, there is provided: a circuit comprising: a first shift register, connected to receive, and to clock in, a sequence of pulses corresponding to reading a magnetic medium; a second shift register, also connected to receive, and to clock through, pulses indicating the location of the last peak detected; error-detect logic, connected and configured to provide an error-detect signal whenever two pulses in succession are received with the same polarity; and reset logic, connected to clear said second register whenever said error-detection logic indicates that two pulses in succession have been received with the same polarity, whereby the second of said two pulses in succession has been clocked into said second register.

According to another disclosed class of innovative embodiments, there is provided: a circuit for filtering analog pulse outputs from an RLL-formatted storage medium having a known maximum RLL length, comprising: a first shift register, comprising at least as many stages as said maximum RLL length, connected to receive, and to clock in, a sequence of analog pulses; a second shift register, also connected to receive, and to clock through, pulses indicating the location of the last peak detected; error-detect logic, connected and configured to provide an error-detect signal whenever two pulses in succession are received with the same polarity; and reset logic, connected to clear said second register whenever said error-detection logic indicates that two pulses in succession have been received with the same polarity, whereby the second of said two pulses in succession has been clocked into said second register.

According to another disclosed class of innovative embodiments, there is provided: a method for filtering transition peaks received from a disk drive read circuit comprising: carrying peaks corresponding to positive and negative-going impulses in at least one first shift register; carrying a pointer in a second shift register which indicates the location of the last peak detected; and when a second peak of the same polarity as the preceding peak is affected, then wiping the previous location of said peak in said pointer register, and wiping the bit in said first shift register which corresponds to the previously detected peak of the same polarity.

According to another disclosed class of innovative embodiments, there is provided: a method for filtering transition peaks received from a disk drive read circuit, for use with an RLL-formatted disk drive having a maximum RLL length, comprising: carrying peaks corresponding to positive and negative-going impulses in at least one first shift register having a number of stages which is at least equal to said maximum RLL length, but less than twice said maximum RLL length; carrying a pointer in a second shift register which indicates the location of the last peak detected, said second shift register having a length which is at least equal to the length of said first shift register; and when a second peak of the same polarity as the preceding peak is affected, then wiping the previous location of said peak in said pointer register, and wiping the bit in said first shift register which corresponds to the previously detected peak of the same polarity.

According to another disclosed class of innovative embodiments, there is provided: a survival sequence register for a read channel employing a variable threshold qualification, comprising a first and a second input for receiving two serial streams of coded digital data, corresponding to qualified peaks detected by a reading pick-up, of positive and negative sign, respectively, a third input for receiving a clock signal, a fourth input for receiving a reset signal and an output through which a serial digital data stream, equivalent to the logic sum of said two streams, purged of spurious "1" eventually present in said two input serial streams and corresponding to spurious qualified peaks, is delivered, characterized by comprising means capable of producing a serial stream equivalent to the logic sum of said two input serial streams; a first shift register for receiving said serial sum stream and outputting said purged serial stream; a control circuit suitable to receive through a first and a second input said serial input streams and to generate an erase signal upon receiving, through one or the other of said inputs, a pulse corresponding to a detected peak having the same sign of a previously detected peak; a second pointer shift register, capable of pointing a logic "1" of a sequence shifting through said first register and which precedes a logic "1" corresponding to a detected peak of the same sign of the peak corresponding to said preceding logic "1"; means responding to said erase signal and to said pointer capable of erasing said logic "1" selected by said pointer.

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, the hardware configurations used to implement the specific logic and delay relations of the presently preferred embodiment can be altered in many ways while still obtaining the functional relationships described above.

The described circuits are contemplated as particularly advantageous in an integrated circuit which provides a complete Hard Disk Read/Write Channel. However, these circuits can also be used in other applications, e.g. in higher levels of integration.

For another example, it is alternatively possible to carry the positive and negative peaks in separate registers, instead of merging them into a single stream of pulses as shown.

For another example, the depth of the shift registers shown can be changed to accommodate the RLL parameters of various target applications, or to provide additional delay if needed for other reasons.

For another example, other circuit elements can be added to, or substituted into, the specific circuit topologies shown.

What is claimed is:

1. A circuit comprising:
   a first shift register, connected to an external logic to receive, and to clock in, a sequence of pulses corresponding to read head signals from a magnetic medium;
   a second shift register, connected to said first shift register to receive, and to clock through, pulses indicating a location within said first shift register of the last pulse clocked in;
   error-detect logic, connected to said first shift register to provide an error-detect signal whenever two pulses in succession are received by said first shift register with the same polarity; and
   reset logic, connected to said error-detect logic and said first and second shift registers to clear said location in said first register which is indicated by said second register whenever said error-detect signal indicates that two pulses in succession have been received by said first shift register with the same polarity, and to clear said second shift register when two pulses in succession have been received by said first shift register with the opposite polarity.

2. The circuit of claim 1, wherein said first shift register and said second shift register have equal numbers of stages.

3. A circuit for filtering analog pulse outputs from a run length limited (RLL) formatted storage medium having a known maximum RLL length, comprising:
   a first shift register, comprising at least as many stages as said maximum RLL length, connected to an external logic to receive, and to clock in, a sequence of analog pulses;
   a second shift register, connected to said first shift register to receive, and to clock through, pulses indicating a location within said first shift register of the last pulse clocked in;
   error-detect logic, connected to said first shift register to provide an error-detect signal whenever two pulses in succession are received by said first shift register with the same polarity; and
   reset logic, connected to said error-detect logic and said first and second shift registers to clear said location in said first register which is indicated by said second register whenever said error-detect signal indicates that two pulses in succession have been received by said first shift register with the same polarity, and to clear said second shift register when two pulses in succession have been received by said first shift register with the opposite polarity.

4. The circuit of claim 3, wherein said first shift register and said second shift register have equal numbers of stages.

5. A method for filtering transition peaks received from a disk drive read circuit, comprising:
   carrying peaks corresponding to positive and negative-going impulses in at least one data shift register;
   carrying a pointer in a pointer shift register which indicates a location within the data shift register of the last one of said peaks;
   when a peak of the same polarity as a respective preceding peak is detected, then wiping the bit in said data shift register, at said location indicated by said pointer, which corresponds to the last one of said peaks of the same polarity; and
   when a peak of the opposite polarity as a respective preceding peak is detected, then wiping the contents of said pointer register.

6. The method as in claim 5, wherein said step of carrying peaks uses only one said data shift register.

7. The method as in claim 5, further comprising the preliminary step of applying adaptive thresholding to said peaks.

8. A method for filtering transition peaks received from a disk drive read circuit, for use with a run length limited (RLL) formatted disk drive having a maximum RLL length, comprising:
   carrying peaks corresponding to positive and negative-going impulses in at least one data shift register having a number of stages which is at least equal to said maximum RLL length, but less than twice said maximum RLL length;
   carrying a pointer in a pointer shift register which indicates a location within said data register of the last one of said peaks, said pointer shift register having a length which is at least equal to the length of said data shift register;

when a peak of the same polarity as a respective preceding peak is detected, then wiping the bit in said data shift register, at said location indicated by said pointer, which corresponds to the last one of said peaks of the same polarity; and when a peak of the opposite polarity as a respective preceding peak is detected, then wiping the contents of said pointer shift register.

9. The method as in claim 8, wherein said step of carrying peaks uses only one said shift register.

10. The method as in claim 8, further comprising the preliminary step of applying adaptive thresholding to said peaks.

11. A survival sequence register for a read channel employing a variable threshold qualification, comprising:

first and second inputs for receiving two serial streams of coded digital data, corresponding to peaks detected by a reading pick-up, of positive and negative sign, respectively;

an output through which a purged serial digital data stream, equivalent to a logic sum of said two serial streams, purged of spurious "1" eventually present in said two input serial streams and corresponding to spurious qualified peaks, is delivered;

a summing means connected to be capable of producing a serial sum stream equivalent to the logic sum of said two input serial streams;

a first shift register connected to said summing means for receiving said serial sum stream and connected to said output to produce said purged serial digital data stream;

a control circuit connected to said first and second inputs to receive said serial streams and to generate an erase signal upon receiving, through one or the other of said inputs, a pulse corresponding to a detected peak having the same sign of a previously detected peak;

a pointer shift register, connected to said control circuit, capable of pointing a logic "1" of a sequence shifting through said first shift register and which precedes a logic "1" corresponding to a detected peak of the same sign of the peak corresponding to said preceding logic "1"; and an erasing means responding to said erase signal and to said pointer capable of erasing said logic "1" within said first shift register selected by said pointer shift register.

12. The register as defined in claim 11, wherein said input serial streams of digital data are coded and said first shift register is composed of a number of flip-flop sufficient for at least a "1" to be present in a correct sequence stored in the shift register.

13. The register as defined in claim 12, wherein said serial input data streams are coded according to a run length limited (RLL) coding.

14. The register as defined in claim 13, wherein said control circuit generates a first signal upon the arrival at an input thereof of a logic "1" following a logic "1" received through the same input, and a complementary signal thereto.

15. The register as defined in claim 12, wherein said control circuit generates a first signal upon the arrival at an input thereof of a logic "1" following a logic "1" received through the same input, and a complementary signal thereto.

16. The register as defined in claim 11, wherein said responsive means comprises a logic NAND gate suitable to drive a reset input for each flip-flop that compose said first shift register with the exception of the first flip-flop of the register, and having a first input receiving said erase signal, a second input functionally connected to a corresponding tap of said pointer shift register and a third input connected to the Q output of the respective flip-flop that is reset by the logic NAND gate.

17. The register as defined in claim 16, wherein all the flip-flops that compose said pointer shift register, with the exception of the first flip-flop, have a reset terminal that is driven in common with the other by an erase signal of the pointer when a "1" of one or the other of said two input serial streams is due to a peak of opposite polarity of the peak relative to the preceding "1".

18. The register as defined in claim 17, wherein said control circuit generates a first signal upon the arrival at an input thereof of a logic "1" following a logic "1" received through the same input, and a complementary signal thereto.

19. The register according to claim 18, wherein said complementary signal is fed to an input of a logic NAND gate, having a second input to which said sum serial stream is applied, the output of said logic NAND gate being connected to a reset terminal of all the flip-flops that compose said second pointer register with the exception of the first flip-flop.

20. The register as defined in claim 16, wherein said control circuit generates a first signal upon the arrival at an input thereof of a logic "1" following a logic "1" received through the same input, and a complementary signal thereto.

21. The register according to claim 20, wherein said first signal is applied to a first input of an AND gate, having a second input to which said sum serial stream is applied, the output signal of said AND gate being timed by a flip-flop, the output Q signal of which is fed to said first input of said erase NAND gates.

22. The register as defined in claim 11, wherein said control circuit generates a first signal upon the arrival at an input thereof of a logic "1" following a logic "1" received through the same input, and a complementary signal thereto.

* * * * *